Patented Apr. 27, 1954

2,676,996

UNITED STATES PATENT OFFICE 2,676,996

PRODUCTION OF FLUORINE COMPOUNDS RICH IN FLUORINE

Charles B. Miller, Lynbrook, N. Y., and John D. Calfee, Dayton, Ohio, assignors to Allied Chemical & Dye Corporation, New York, N. Y., a corporation of New York No Drawing. Application August 3, 1951,
Serial No. 240,288

10 Claims. (Cl. 260—653)

This invention relates to the preparation of fluorine-rich organic compounds useful as chemical intermediates and in the refrigerating and propellant fields. More specifically, the present improvements are directed to processes for making aliphatic fluoro compounds rich in fluorine from aliphatic fluoro compound starting materials of lower fluorine content.

Several processes are known for fluorinating organic compounds. Thus, it has been proposed to employ fluorine, hydrogen fluoride, or metallic fluorides such as mercuric fluoride and antimony trifluoride as fluorinating agents with or without catalysts.

A principal object of our invention is to provide for manufacture of aliphatic fluoro compounds rich in fluorine from aliphatic fluoro starting materials of lower fluorine content by processes which do not require the use of fluorinating agents which are expensive, difficult to make and troublesome to handle and use. Another object is provision of processes for preparing fluoro derivatives of methane containing a high fluorine content from fluoro derivatives of methane of lower fluorine value by means of easily controlled disproportionation operations made possible by a particular hereindescribed catalyst. Moreover, the invention affords development of a completely gas phase method for preparing fluorine rich compounds by employment of the novel solid catalyst of the invention.

The starting materials of the invention comprise fluoro derivatives of methane containing not more than two fluorine atoms and at least one halogen, e. g. chlorine, atom other than fluorine. Such materials may or may not contain one or more hydrogen atoms. In accordance with the invention, it has been discovered that aluminum fluorides of extremely small crystal size hereinafter more fully described, have the property of catalyzing disproportionation of the starting materials of the invention to such an extent that the disproportionation operation may be carried out at relatively low temperatures, e. g. not above about 350–400° C., or not above 550° C., depending upon the nature of the particular starting material involved. Major operating advantages afforded by the invention are that the hereindescribed reactions may be effected in simple gas phase-solid catalyst manner at relatively low temperatures which appear to be attributable to the properties and characteristics of the aluminum fluoride catalysts utilized in accordance with the invention. In general, practice of the invention includes contacting a gaseous material comprising a fluoro derivative of methane containing not more than two fluorine atoms and at least one halogen atom other than fluorine, at a temperature not above about 550° C., with the hereindescribed aluminum fluoride catalysts.

Aluminum fluorides from a multiplicity of sources are known in the art. The majority of such materials consist of lumps or smaller discrete particles which in turn are composed of $AlF_3$ crystals of relatively large size, i. e. not less than one thousand and usually several thousand Angstrom units radius and above as in the case of commercial types of aluminum fluoride available on the market. However, certain forms of $AlF_3$, when examined even by the highest powered optical microscope, appear to be of noncrystalline or "amorphous" structure. When such "amorphous" aluminum fluorides are examined using X-ray diffraction technique, extremely small, sub-microscope crystals, "crystallites," may be detected. According to the invention, such "amorphous" substantially anhydrous aluminum fluorides, having crystals of certain sub microscopic (crystallite) size, are used in the disporportionation operations outlined above. Enhanced catalytic activity may be noted by use of aluminum fluorides of crystallite size of about 500 Å. radius or below and accordingly the advantages of the invention may be realized operating with such catalytic material, particularly in instances where only a moderately low operating temperature is satisfactory. As crystallite size decreases below this value, desired catalytic activity increases and particularly suitable aluminum fluorides include those having crystallite size of about 200 Å. and below (as determined by X-ray diffraction technique). We have found that by contacting the starting materials described with our improved catalyst, transformation to compounds richer in fluorine may be realized at the relatively low temperatures indicated above. Although advantageous catalytic properties realized in practice of the invention are peculiar to crystallites, such properties are not destroyed but merely diluted by the presence of the larger crystals.

Aluminum fluorides having the indicated crystallite size and catalytic activity are included within the scope of the invention regardless of method of preparation. However, according to a particular embodiment of the invention, improved catalytic material is employed which is prepared by treating aluminum halide other than aluminum fluoride (which halide is preferably in pure form but may suitably be of commercial or technical grades) with preferably excess quantities of inorganic fluorinating agent reactive therewith under conditions such that no liquid water is present in the reacting materials. For example catalyst may be prepared by treating solid hydrated aluminum halide with gaseous fluorinating agent (said agent being preferably, but not necessarily, anhydrous) at temperature high enough so that the water in the hydrate is volatilized into the gas, e. g. preferably above about 100° C. to 170° C., the maximum temperature for avoiding fusion depending largely upon the degree of hydration of the reactant and the water content, if any, of the fluorinating agent. If desired, anhydrous reagents may be employed, in which case maintenance of particular temperatures during the catalyst preparation reaction is not as critical and said reaction may be carried out with fluorinating agent in the liquid phase. Of the fluorinating agents which may be used for catalyst preparation, boron trifluoride and hydrofluoric acid may be mentioned. We prefer anhydrous hydrofluoric acid. Anhydrous aluminum chloride is the preferred halide. Catalyst synthesis reaction is believed to proceed as follows:

$$3HF + AlCl_3 = AlF_3 + 3HCl$$

HF displaces HCl causing transformation of $AlCl_3$ into $AlF_3$. The remaining aluminum fluoride may be activated by heating in an anhydrous atmosphere at elevated temperature, i. e. temperature at which activation takes place (presumably accompanied by vaporization and removal of any amounts of water of hydration). The finished catalyst is then recovered. It has been found that heating the $AlF_3$ in a stream of dry nitrogen or HF gas for about one to four hours at temperatures of about 300–350° C. or four to six hours at 250–300° C. is ordinarily suitable for this purpose. If desired, the catalyst may be activated by heating the $AlF_3$ in a stream of free oxygen-containing gas such as oxygen or air at about 400–600° C. for approximately 30 minutes to six and one-half hours (depending mostly on the $O_2$ content of the treatment gas), in which case activation with dry nitrogen or HF gas as aforesaid, may be omitted.

Although not essential to realization of the objects of the invention, a suitable and convenient procedure for preparing the aluminum fluoride catalyst is to add solid anhydrous aluminum chloride to an excess of liquefied anhydrous hydrofluoric acid in a cooled container and, after complete addition of the aluminum chloride, mildly to agitate the mixture until reaction is substantially complete. The $AlF_3$ so prepared is then activated as outlined above. Following are Examples A and B illustrating preparation of $AlF_3$ catalyst according to the latter procedure.

*Example A*

300 parts of granular (4 to 20 mesh) anhydrous aluminum chloride of commercial grade were added in small portions to an excess of liquid anhydrous hydrofluoric acid contained in an externally cooled nickel vessel. A vigorous exothermic reaction took place, and additional amounts of hydrofluoric acid were added as needed to maintain an excess thereof. After all of the aluminum chloride had been added, the mixture was stirred to promote interaction of residual amounts of reactants and the excess hydrofluoric acid was removed by evaporation. 150 parts of anhydrous aluminum fluoride ($AlF_3$) of about 16 mesh size were recovered which, upon analysis, was found to contain less than 0.15% chlorine. This $AlF_3$ product was activated by heating in a stream of dry inert gas (nitrogen) at a temperature sufficiently elevated (350° C.) and a period of time sufficiently long to drive off HF and/or water held by the aluminum fluoride. An X-ray diffraction pattern of the aluminum fluoride product was made. The crystallite size of the material was found to be so small as to be indicative of "amorphous" structure. Chemical analysis showed the $AlF_3$ content to be greater than 98%.

*Example B*

300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride of about 10–40 mesh size having greater than 98% $AlF_3$ content and containing less than 0.15% chlorine were recovered. This $AlF_3$ was heated in a stream of dry inert gas (nitrogen) at a sufficiently elevated temperature (259–300° C.) and a period of time sufficiently long (4–6 hours) to drive off residual amounts of water and activate the material. An X-ray diffraction pattern of material prepared according to the method outlined above, indicated crystallite size to be less than 100 Angstrom units radius, i. e. the crystallite size was so small as to be indicative of "amorphous" structure as desired for the purpose of the present invention. The mesh size distribution of the $AlF_3$ particles did not change appreciably during the latter heat treatment.

As indicated above a particular procedure utilizing HF gas as fluorinating agent for the $AlCl_3$ comprises treating anhydrous $AlCl_3$ or the hydrate with HF gas (preferably anhydrous) at temperature sufficiently high to cause reaction between $AlCl_3$ and HF and to volatilize and maintain any water present in the system in the gas phase (preferably 100–170° C., consistent with avoidance of fusion, in case the hydrate is employed), but low enough to prevent excessive volatilization of $AlCl_3$ (preferably below about 125° C. when anhydrous $AlCl_3$ is treated), and thereafter activating the $AlF_3$ produced. Aluminum fluoride so prepared has also been found to be composed of crystallites of size substantially below 200 Å. Gas phase preparation of catalyst is illustrated by the following example, in which parts expressed are by weight.

*Example C*

600 parts of 4 to 18 mesh anhydrous aluminum chloride of commercial grade were charged to a nickel reactor and heated therein while passing through the reactor a stream of anhydrous HF gas to bring about the following reaction:

$$AlCl_3 + 3HF \rightarrow AlF_3 + 3HCl$$

The HF was admitted at a sufficiently slow rate to keep the temperature in the reaction zone (exothermic reaction) below about 90° C. to prevent excessive loss of $AlCl_3$ by volatilization. As the reaction neared completion, as evidenced by a sharp decline in reactor temperature, heat was applied externally to the reactor and temperature raised to about 300° C. while still continuing passage of a slow stream of HF through the tube, until last traces of $AlCl_3$ were converted to $AlF_3$. The $AlF_3$ so formed was then activated by heating it in a stream of air at about 450–500° C. for about 30 minutes. The size and shape of the solid material was about the same before and after treatment with gaseous HF. 500 parts of anhydrous aluminum fluoride containing 98–99% $AlF_3$ and less than 0.10% chlorine, were recovered. An X-ray diffraction pattern of the material prepared according to the latter gas phase procedure was made which indicated crystallite size to be in the range 100–200 Angstrom units radius the average being 140 Å., i. e. the crystallite size was so small as to be indicative of "amorphous" structure as desired for fluorination of unsaturated hydrocarbon derivatives according to the present invention.

If desired, the catalyst may be used in the form of a fluidized solid bed or suspended on a non-siliceous inert carrier such as activated alumina, metal fluorides or nickel. Suitable methods for preparing this suspended catalyst include dissolving the aluminum compound in a solvent therefor, applying the solution to the carrier, evaporating the solvent and then treating the aluminum compound impregnated carrier with fluorinating agent. According to an alternative procedure, the aluminum compound, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a gas stream, condensed on the carrier, and then treated to convert it to aluminum fluoride.

Broadly considered, practice of the invention involves contacting a gaseous material comprising a fluoro derivative of methane containing not more than two fluorine atoms and at least one halogen atom other than fluorine, at disproportionation temperature not above 550° C., with the above described aluminum fluoride catalysts having crystallite size below about 500 Angstrom units radius, preferably below about 200 Angstrom units radius. Specific temperatures employed are dependent upon the particular starting material utilized and upon the final product desired. It has been found that satisfactory temperatures lie in the range of 75–550° C. The condensation of liquid material on catalyst has a noted deleterious effect upon its activity and, accordingly, temperatures in all instances should be maintained above the temperature at which any material tends to condense out on the catalyst at the pressure of the system. Pressures may be reduced or elevated, but pressures approximating atmospheric and sufficient to move the gas through the system are satisfactory.

According to a first major phase of the invention, the initial fluoro derivative of methane containing not more than two fluorine atoms and at least one halogen (e. g. chlorine) atom other than fluorine, may be completely halogenated. In this instance, the starting material may be $CCl_3F$ or $CCl_2F_2$ or mixtures of both.

In connection with production of certain halofluorocarbons, substantial amounts of $CCl_3F$ are formed as a by-product, and in some instances it is desirable to convert such $CCl_3F$ to more highly fluorinated products. Thus, the invention affords marked commercial advantage by providing a catalytic method for transformation by disproportionation of $CCl_3F$ into more highly fluorinated material, i. e. $CCl_2F_2$ or $CClF_3$, preferably into reaction product comprising a major amount of $CCl_2F_2$, which method may be carried out at relatively low temperatures. In this connection, it has been found that at reaction temperatures below about 120° C., preferably below about 115° C., in the presence of our improved aluminum fluoride catalysts, $CCl_3F$ is transformed preferentially into $CCl_2F_2$. On the other hand, temperatures above about 120° C. favor the transformation to $CClF_3$ (useful as a refrigerant). Temperatures above about 75° C. at substantially atmospheric pressure are satisfactory. When it is desired to prepare predominantly $CCl_2F_2$ from $CCl_3F$, temperatures above the condensation temperature (at the pressure maintained on the system) of the material being treated, but below about 120° C., preferably below about 115° C. are employed.

On the other hand, if it is desired to increase formation of $CClF_3$, temperatures above about 120° C., may be utilized. When using $CCl_3F$ as starting material, as temperature is increased above about 200° C., improvement in conversion of $CCl_3F$ to more highly fluorinated material is not particularly marked. Operating at elevated temperatures involves certain well recognized disadvantages, e. g. greater difficulty and expense in supplying heat. By shortening the time of contact of reactants with the catalyst, and recycling incompletely reacted material, such higher temperatures, e. g. in the range of 200 to 350° C., may be employed, however, and certain advantageous objects of this invention thereby obtained. Accordingly, such higher temperatures are intended to be included within the scope of the invention, but preferred operation for preparation of predominant proportions of $CClF_3$ from $CCl_3F$ starting material is directed to use of temperatures of approximately 120–200° C.

At temperatures of about 350° C. when using $CCl_3F$ as a starting material the product gas contains no appreciable amount of $CCl_2F_2$, indication being that any $CCl_2F_2$, if formed, is in turn disproportionated to $CClF_3$ and $CCl_4$. Hence, the process of the invention is adaptable for manufacture of $CClF_3$ from $CCl_2F_2$ as a starting material. When using $CCl_2F_2$ as a starting material, temperatures may lie in the range of 275–400° C., and are preferably in the range of 300–400° C. Accordingly, in the case of completely halogenated starting materials, temperatures may lie in the overall range of 75–400° C.

Referring again particularly to use of $CCl_3F$ as starting material, there is no critical maximum time of contact of $CCl_3F$ reactant with aluminum fluoride catalyst. At long contact times, however, the capacity of the reactor is low, and an economic disadvantage inheres in the operation. On the other hand, if time of contact is too short the reaction of $CCl_3F$ to produce the desired product may be incomplete. This results in the appearance of relatively small amounts of sought-for material and relatively large amounts of unreacted $CCl_3F$ in the reaction product. Such unreacted $CCl_3F$ may be recovered from the product and returned to the reaction, but in such operation cost of recovering and recycling unreacted material may amount to an appreciable item. Accordingly, the time of contact employed is determined by balancing the economic advantage of high reactor capacity obtained at short contact times against cost of recovery of unreacted $CCl_3F$. Further, flow of gaseous reactants through the reaction zone is dependent upon variables, such as scale of the operation, quantity of catalyst in the reactor, and specific apparatus employed, and optimum rate of flow for any given conditions may be determined by a test run.

For convenience, atmospheric pressure operation is preferred, but the reaction may, if desired, be carried out at superatmospheric or subatmospheric pressure.

The process of the invention may be suitably carried out by introducing a gaseous material comprising $CCl_3F$ into a reaction zone containing aluminum fluoride prepared as above and heating said material in the zone at the temperatures heretofore indicated for a time sufficient to convert an appreciable amount of $CCl_3F$ to a compound richer in fluorine, withdrawing gaseous products from the zone and recovering said compound richer in fluorine from the gaseous products. Although not limited to continuous operations, the process of our invention may be advantageously carried out thereby.

The various reaction products may be recovered separately or in admixture from the reaction zone exit gas stream in any suitable manner. The gas discharged from the reactor zone is cooled in a condenser to about 30° C. to condense $CCl_4$ (B. P. 78° C.) and thence passed to a soda-lime tower to remove from the gas stream any possible traces of HF, HCl and $Cl_2$, a $CaCl_2$ tower to remove any possible traces of water and a vessel externally cooled with Dry Ice and acetone to condense $CCl_2F_2$ (B. P. minus 29.8° C.), some $CClF_3$ (B. P. minus 81° C.) and any unreacted $CCl_3F$ (B. P. 23.8° C.). In event that appreciable amounts of $CClF_3$ are present in the product, the off-gas from the Dry Ice-acetone cooled condenser may be passed subsequently through a condenser cooled by, e. g. liquid nitrogen to a temperature of about minus 95° C. to condense $CClF_3$. Individual compounds may be recovered, e. g. by distillation, from the condensates obtained as above. Unreacted $CCl_3F$ recovered may be recycled to subsequent operation.

While the exact mechanisms of the disproportionation of $CCl_3F$ taking place in the practice of our invention are not wholly understood, it is believed that the aluminum fluoride acts essentially as a catalyst at the high temperatures stated since no appreciable amount of aluminum chloride has been found in the reaction zone exit gas. At the temperatures indicated, the aluminum fluoride brings about a redistribution of fluorine and the other halogen atoms present to produce aliphatic fluoro compounds richer in fluorine than the original $CCl_3F$, as well as some $CCl_4$. Operations show that the composition of the aluminum fluoride does not change, and hence it appears that the aluminum fluoride does not act as a fluorinating agent in the usual sense and provides substantially no available fluorine during the course of the reaction. When $CCl_3F$ is employed as starting material, the overall reaction involved appears to be represented by the following equations:

$$2CCl_3F \rightarrow CCl_2F_2 + CCl_4$$

or $$3CCl_3F \rightarrow CClF_3 + 2CCl_4$$

and when the starting material utilized is $CCl_2F_2$, the reaction apparently involved is indicated by the following equation:

$$3CCl_2F_2 \rightarrow 2CClF_3 + CCl_4$$

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Externally disposed reactor tube heating means such as steam jacket or electrical heaters may be supplied.

The following examples illustrate practice of our invention as applied to use of $CCl_3F$ as starting material, parts and percentages being by weight.

*Example 1.*—30 parts of the aluminum fluoride prepared as in above Example A were arranged in a fixed bed in the upper half of a vertically mounted ¾ inch internal diameter, 18 inch long nickel tube. The entire tube, except for the ends, was encased in a steam jacket, and the tube ends were fitted with pipe connections for the inlet and outlet of a gas stream and for the insertion into the nickel pipe and catalyst bed of a suitable thermometer. $CCl_3F$ was vaporized, introduced into the bottom of the nickel pipe, passed upwardly through the bottom (empty) portion of the pipe where the stream was preheated, and thence passed through the bed of $AlF_3$ at a space velocity of about 3 parts $CCl_3F$ per part $AlF_3$ per hour. By suitably adjusting the steam pressure in the jacket, thereby to control the rate of heat input into the gas stream, the temperature of the catalyst bed was maintained at about 105° C., at which temperature no condensation of materials of the gas stream took place. Gaseous products of the reaction were withdrawn overhead, cooled to about 30° C. to condense $CCl_4$, thence passed through a soda lime tower, a $CaCl_2$ tower and through a vessel externally cooled with Dry Ice and acetone to condense $CCl_2F_2$, $CClF_3$, any unreacted $CCl_3F$ and trace quantities of by-product halocarbons. After operating in this manner for 66 hours, during which time 6000 parts of $CCl_3F$ had been passed through the $AlF_3$ bed, a sample of the condensate formed in the Dry Ice-acetone cooler was collected over a period of 2 hours. Upon distillation, the following amounts of products were found in the sample: 70.1 parts $CCl_2F_2$, 2.0 parts $CClF_3$, 15.7 parts $CCl_3F$ and 95.5 parts $CCl_4$. During the 2 hour period when the sample was collected, 183 parts of $CCl_3F$ were charged to the nickel reactor. Based on fluorine recovery, 87.2% of the $CCl_3F$ charged was recovered as $CCl_2F_2$, 4.3% as $CClF_3$, and 8.6% as unreacted $CCl_3F$. Operation under these conditions was continued for a total of 404 hours, realizing an aggregative throughput of 1290 parts $CCl_3F$ per part of catalyst and a yield of 400 parts $CCl_2F_2$ per part of catalyst.

*Example 2.*—$CCl_3F$ was vaporized and passed through the apparatus described in Example 1 containing 30 parts of fresh aluminum fluoride activated catalyst prepared from anhydrous aluminum chloride and anhydrous HF by the method outlined in Example A. Temperature of the catalyst bed was maintained at about 170° C. and space velocity at about 3 parts CCl₃F per part catalyst per hour. Gaseous products of the reaction were withdrawn overhead, cooled to about 30° C. to condense CCl₄, thence passed through a soda lime tower and a CaCl₂ tower. The gas stream leaving the CaCl₂ tower was passed through a condenser cooled with liquid nitrogen to condense CCl₃F, CCl₂F₂ and CClF₃. Operation in this manner was conducted for 2 hours, during which time 180 parts of CCl₃F were passed through the catalyst bed. Upon distillation of the materials recovered in the condenser, the following amounts of products were obtained. 36 parts CClF₃ 15 parts of CCl₂F₂, 9 parts of CCl₃F and 114 parts of CCl₄. Based on fluorine recovery 18% of the CCl₃F charged was recovered as CCl₂F₂, 78% as CClF₃ and about 4% as unreacted CCl₃F.

*Example 3.*—600 parts of commercial lump anhydrous aluminum chloride was reacted with an excess of liquid anhydrous HF in the manner described in Example A. After boiling off excess HF the AlF₃ residue was heated in a nickel tube at 100° C. to drive off the bulk of the absorbed HF, and then treated with dry nitrogen at 205° C. for 2 hours to activate the catalyst and remove residual adsorbed HF. 340 parts of AlF₃ were recovered and found to contain less than 0.01% chlorine. A sample of the aluminum fluoride prepared, stored in an atmosphere of CCl₃F vapor at 30° C. and one atmosphere pressure, adsorbed 1.85 parts of CCl₃F per 100 parts of AlF₃ sample. Crystallite size of the catalyst was determined by the standard X-ray diffraction technique and found to be less than 100 Angstrom units radius. 25 parts of the AlF₃ were charged into a ½″ diameter electrically heated nickel reactor and CCl₃F was passed through the catalyst maintained at a temperature of about 160° C. The CCl₃F charged to the reactor was converted substantially quantitatively to a mixture of CCl₄, CCl₂F₂ and CClF₃.

*Example 4.*—The disproportionation catalyst from Example 3 was removed from the reactor, placed in a vessel and maintained therein at a temperature of 700° C. for one hour. The catalyst was then returned to the half inch nickel reactor and CCl₃F was passed through it while slowly raising the catalyst temperature. Substantially no disproportionation took place until reactor temperature had been raised to about 350° C., and at 450° C. the conversion to disproportionation products was high. Upon cooling the reactor, the disproportionation reaction ceased at temperature in the range 350–360° C. X-ray fraction diagram for the catalyst indicated a highly crystalline structure, i. e. greater than 1000 Å. radius. The adsorptivity of the catalyst for CCl₃F was again measured and found to be 0.1 part of CCl₃F per 100 parts of sample, indicating an increase in crystallite size and a decrease in surface area as compared with the same catalyst before heat treatment.

*Example 5.*—Commercial aluminum fluoride purchased from Aluminum Company of America, 95.5% AlF₃, was examined by the X-ray diffraction technique and found to be composed of crystals of very large size. Crystals of the material were visible to the naked eye. The adsorptivity for gaseous CCl₃F was 0.1 part per 100 parts of AlF₃, indicating a greater crystal size and lower surface area as compared with the aluminum fluoride manufactured in the procedure described in Example 1. When treated similarly as the AlF₃ prepared from AlCl₃, Example 4 above (i. e. catalyst temperature gradually increased while in a stream of gaseous CCl₃F), appreciable disproportionation of CCl₃F did not take place below temperature of about 550° C.

Following is an example of practice of the invention using CCl₂F₂ in the starting material:

*Example 6.*—A ½″ I. D. nickel reactor was packed with 150 parts of AlF₃ catalyst prepared in accordance with above Example C. CCl₂F₂ at a rate of about 123 parts per hour was passed through the reactor while the temperature therein was maintained at about 350° C. Product gases were passed thru a trap at 0° C. to condense out CCl₄, thence through a soda lime tower to remove traces of acidic constituents, dried with CaCl₂, and sampled by means of an infrared analyzing cell. Infrared spectrograms showed gases to be primarily CClF₃ containing small quantities of unreacted CCl₂F₂ and some CCl₄. No CCl₃F was found.

Practice of a second major phase of the invention involves contacting a gaseous material comprising a fluoro derivative of methane containing not more than two fluorine atoms and at least one halogen atom other than fluorine and at least one hydrogen atom, at disproportionation temperature not above 550° C., with the hereindescribed aluminum fluoride catalysts. Accordingly, the invention includes use of e. g. CHClF₂, CHCl₂F and CH₂ClF as starting materials.

In practice, the starting material such as CHClF₂ or CHCl₂F in a gas phase is contacted under certain hereinafter defined temperature conditions with the described aluminum fluoride for time sufficient to disproportionate appreciable amount of starting material to form compound richer in fluorine. The aluminum fluorides have the property of catalyzing the disproportionation of the fluoro derivatives of methane containing hydrogen, such as CHClF₂ or CHCl₂F, to form compound richer in fluorine to such an extent that good yields and conversions, and efficient and smooth operation may be realized under readily maintained operating conditions. The term "conversion" indicates the amount of starting material which undergoes reaction, and the term "yield" indicates the percentage of sought-for material recovered based on the amount of such material theoretically obtainable from the starting material converted.

The reaction which is brought about in some measure is determined by the choice of starting material. When CHClF₂ is employed reaction may be represented by the following equation:

$$3CHClF_2 \rightarrow 2CHF_3 + CHCl_3$$

On the other hand, when CHCl₂F is employed, product may include appreciable amounts of CHClF₂ in addition to CHF₃, reaction apparently proceeding as follows:

$$2CHCl_2F \rightarrow CHClF_2 + CHCl_3$$
$$3CHCl_2F \rightarrow CHF_3 + 2CHCl_3$$

As indicated in the above equations, in addition to the primary sought-for material, chloroform (CHCl₃) is also produced and may be recovered separately.

While the mechanism of the reaction of this invention is not entirely clear, the overall effect appears to be that some of the molecules of CHClF₂ or CHCl₂F starting material serve as a source of fluorine for other molecules. Molecules which accept fluorine thereby form more highly fluorinated compound, and the molecules which donate fluorine form principally the fluorine free compound $CHCl_3$. Appreciable though minor amounts of unreacted starting material may also be present with the reaction products.

Reaction zone temperatures are maintained at or above the level at which disproportionation of the indicated starting materials begins to take place. Some reaction takes place at temperature as low as about 275° C. and at 300° C. reaction resulting in the formation of more highly fluorinated compounds is substantial. As indicated below, choice of temperature is a factor of importance in determining space velocity (time of contact of reactant with catalyst) which may be maintained without sacrificing desired high conversions. Higher temperatures tend to increase speed of reaction and thereby afford high conversion even with short time of contact (high space velocity), leading to greater poundage output rate of product for a given reactor. To obtain such desired high reaction rate, temperature is preferably maintained above about 300° C. Disproportionation proceeds and important yields of sought-for products are obtained at temperatures as high as about 550° C. but as temperatures increase significantly above 500° C. a tendency of deposition of carbon on the $AlF_3$ catalyst may be noted. Hence, preferred operating temperatures are in the approximate range 300–400° C.

Time of contact of reactant with aluminum fluoride catalyst may be varied to some extent without sacrifice of advantageous high yields and efficient operation. However, if contact time is excessive, i. e. at relatively low space velocities, the capacity of the reactor is low, thereby causing economical disadvantages in the operation. On the other hand, if contact time is too short, i. e. at excessively high space velocities, the reaction of $CHClF_2$ or $CHCl_2F$ to form desired product may be incomplete, thereby entailing possible high cost of recovering and recycling unreacted material to subsequent operation. At temperatures in the higher portions of the ranges indicated above, effective disproportionation may be obtained at relatively short contact times, whereas if lower temperatures are maintained long contact time may be desirable. Accordingly, the time of contact (space velocity) employed is determined by balancing the economic advantage of high reactor capacity obtained at short contact times against cost of recovery of unreacted starting material. In particular operation, optimum rate of flow of $CHClF_2$ or $CHCl_2F$ through the reaction zone is dependent upon variables such as scale of operation, quantity of catalyst in the reactor and specific apparatus employed and may be best determined by test run.

Various reaction products in the reaction zone exit gas stream may be recovered separately or in admixture in any suitable manner. The gas discharged from the reactor is recovered by scrubbing with water to separate easily condensed products, optionally with alkaline material (if it is desired to remove any small amounts of acidic material present) then passed over calcium chloride or other drying agent to remove water, and condensed in a vessel maintained at temperature below the boiling point of the lowest boiling material present, e. g. by cooling the gas in a bath of liquid nitrogen or air. The principal products condensed are $CHF_3$ (B. P. minus 82° C.), $CHClF_2$ (B. P. minus 40.8° C.), $CHCl_2F$ (B. P. 8.9° C.) and $CHCl_3$ (B. P. plus 63.5° C.). Individual compounds may be recovered, e. g. by distillation from condensate obtained above. Unreacted $CHClF_2$ and/or $CHCl_2F$ may be recycled to subsequent operation.

The following examples illustrate practice of the foregoing portion of the invention, parts and percentages being by weight:

*Example 7.*—240 parts of aluminum fluoride catalyst, prepared by procedure similar to Example C above and having crystallite size of about 200 Angstrom units radius, were arranged in a fixed bed supported on a nickel screen in a vertically mounted ¾ inch internal diameter, 3 feet long nickel tube. The tube was externally electrically heated. The tube ends were fitted with pipe connections for the inlet and outlet of a gas stream and for the insertion into the nickel tube and catalyst bed of a suitable thermocouple. Gaseous $CHClF_2$ was passed through a flow meter and thence introduced into the bottom of the nickel reaction tube and passed upwardly through the bed of $AlF_3$ catalyst at the rate of 173 parts per hour. By adjusting the electrical heaters thereby to control the rate of heat input into the gas stream the temperature of the catalyst bed was maintained at about 360° C. Gaseous products of the reaction were withdrawn overhead, cooled, thence passed successively through a water scrubber, a tower containing soda lime and $CaCl_2$ to remove moisture and last traces of acidic constituents, and through a condenser held at about minus 200° C. by means of an external cooling bath of liquid nitrogen. After passing 865 parts of $CHClF_2$ through the nickel reactor as above, operation was discontinued. Condensates from the water scrubber and the low temperature condenser were combined, distilled and the following amounts of products were recovered: $CHF_3$, 420 parts and $CHCl_3$, 350 parts. Recovery of unreacted $CHClF_2$ was negligible. Of the total $CHClF_2$ which was introduced into the reactor, substantially 100% was converted and 90% (based on fluoride) was converted to $CHF_3$, i. e. yield of $CHF_3$ based on the amount of such material theoretically obtainable from the $CHClF_2$ converted, was 90%.

*Example 8.*—A gaseous mixture of $CHClF_2$ and $CHCl_2F$, in the proportion of about 1 mol of the former to 1 mol of the latter, was passed through the vertical nickel tube arranged as described in Example 7 and containing 240 parts of $AlF_3$ catalyst prepared by procedure similar to Example C above and having crystallite size of about 200 Angstrom units radius. Internal temperature of the tube was maintained at 375° C. The gas effluxing the tube was cooled, scrubbed with water, soda lime, and $CaCl_2$ and passed through an infrared gas analyzing cell. Spectrograms showed the presence of only $CHF_3$.

This application is a continuation-in-part of our application Serial No. 108,656, filed August 14, 1949, now abandoned.

We claim:

1. The process for disproportionating a gaseous material comprising a completely halogenated fluoro derivative of methane containing not more than two fluorine atoms and at least one halogen atom other than fluorine, which process comprises heating said material free of liquid phase at temperature substantially in the range of 75–400° C. in the presence of aluminum fluoride catalyst having crystallite size below about 500 Angstrom units radius, for a time sufficient to disproportionate a substantial amount of said material to form a compound richer in fluorine.

2. The process of contacting a gaseous material of the group consisting of $CCl_3F$ and $CCl_2F_2$ at disproportionation temperature not above 400° C., with aluminum fluoride catalyst having crystallite size below about 500 Angstrom units radius.

3. The process of contacting a gaseous material comprising $CCl_3F$ at disproportionation temperature below about 350° C. with aluminum fluoride catalyst having crystallite size not substantially greater than about 500 Angstrom units radius.

4. The process for disproportionating $CCl_3F$ which comprises heating a gaseous material comprising $CCl_3F$ and free of liquid phase, at a disproportionation temperature below about 120° C. in the presence of aluminum fluoride catalyst having crystallite size not substantially greater than about 500 Angstrom units radius, for time sufficient to disproportionate an appreciable amount of said $CCl_3F$ to form compound richer in fluorine.

5. The process for converting $CCl_3F$ to $CCl_2F_2$ which comprises introducing a gaseous material comprising $CCl_3F$ into a reaction zone containing aluminum fluoride catalyst having crystallite size not substantially greater than about 200 Angstrom units radius, heating said material in said zone at temperature above that at which condensate forms and below about 120° C. for a time sufficient to convert an appreciable amount of said $CCl_3F$ to $CCl_2F_2$, withdrawing gaseous product from said zone, and recovering said $CCl_2F_2$ from said gaseous product.

6. The process of contacting a gaseous material comprising a fluoro derivative of methane containing not more than two fluorine atoms and at least one halogen atom other than fluorine and at least one hydrogen atom, at disproportionation temperature not above about 500° C., with aluminum fluoride catalyst having crystallite size below about 500 Angstrom units radius.

7. The process for disproportionating a gaseous material comprising a fluoro derivative of methane containing not more than two fluorine atoms and at least one halogen atom other than fluorine and at least one hydrogen atom, which process comprises heating said material free of liquid phase at temperature substantially in the range of 300–400° C. in the presence of aluminum fluoride catalyst having crystallite size below about 500 Angstrom units radius, for a time sufficient to disproportionate a substantial amount of said material to form a compound richer in fluorine.

8. The process of contacting a gaseous material of the group consisting of $CHClF_2$ and $CHCl_2F$ at disproportionation temperature not above about 400° C., with aluminum fluoride catalyst having crystallite size below about 500 Angstrom units radius.

9. The process of disproportionating a compound of the group consisting of $CHClF_2$ and $CHCl_2F$ to form material richer in fluorine which comprises introducing said compound in the gas phase into a reaction zone containing aluminum fluoride catalyst having crystallite size below about 200 Angstrom units radius, heating said compound in said zone in contact with said catalyst at temperature in the range of 300–400° C. for time sufficient to form gaseous reaction product comprising an appreciable amount of said material richer in fluorine, withdrawing said gaseous product from said zone and recovering said compound richer in fluorine from said gaseous product.

10. The process which comprises contacting a gaseous material comprising a fluoro derivative of methane containing not more than two fluorine atoms and at least one halogen atom other than fluorine, at disproportionation temperature not above about 500° C. with aluminum fluoride catalyst having crystallite size below about 500 Angstrom units radius, and recovering from the resulting reaction mixture a compound enriched in fluorine.

References Cited in the file of this patent
UNITED STATES PATENTS

| Number | Name | Date |
|---|---|---|
| 2,478,201 | Miller | Aug. 9, 1949 |